United States Patent

Noguchi et al.

[11] Patent Number: 6,037,030
[45] Date of Patent: Mar. 14, 2000

[54] DISC-LIKE MAGNETIC RECORDING MEDIUM

[75] Inventors: Hitoshi Noguchi; Junichi Nakamigawa; Shinji Saito, all of Kanagawa, Japan

[73] Assignee: Fuji Photo Film Co., Ltd., Kanagawa, Japan

[21] Appl. No.: 09/046,591

[22] Filed: Mar. 24, 1998

[30] Foreign Application Priority Data

Mar. 28, 1997  [JP]  Japan ................................. 9-078180

[51] Int. Cl.[7] ....................................................... G11B 5/82
[52] U.S. Cl. ...................... 428/65.3; 428/328; 428/336; 428/694 BA; 428/694 BS
[58] Field of Search .................... 428/65.3, 328, 428/336, 694 BA, 694 BS, 900

[56] References Cited

U.S. PATENT DOCUMENTS

| | | | |
|---|---|---|---|
| 4,923,766 | 5/1990 | Hosoi et al. | 428/694 |
| 5,728,442 | 3/1998 | Noguchi et al. | 428/65.3 |
| 5,770,302 | 6/1998 | Masaki et al. | 428/323 |

FOREIGN PATENT DOCUMENTS 6-36261  2/1994  Japan ............................... G11B 5/70

*Primary Examiner*—Stevan A. Resan
*Attorney, Agent, or Firm*—Sughrue, Mion, Zinn, Macpeak & Seas, PLLC

[57] ABSTRACT

A disc-like magnetic recording medium is disclosed, which comprises a support having thereon a magnetic layer comprising a ferromagnetic powder and a binder as main components, wherein the ferromagnetic powder has an average long axis length of from 0.01 to 0.18 $\mu$m, a crystallite size of from 50 to 180 Å, an acicular ratio of from 2 to 9, the magnetic layer has the coercive force Hc of from 1,700 to 3,000 Oe, the in-plane orientation ratio of 0.85 or more, and the squareness ratio in the vertical direction to the surface of the magnetic layer of 0.30 or less.

13 Claims, No Drawings

DISC-LIKE MAGNETIC RECORDING MEDIUM

FIELD OF THE INVENTION

The present invention relates to a coating type disc-like magnetic recording medium capable of high density recording (i.e., a disc-shaped magnetic recording medium for high density recording which is-prepared by means of coating).

BACKGROUND OF THE INVENTION

In the field of a magnetic disc, a 2 MB MF-2HD floppy disc using Co-modified iron oxide has been generally loaded in a personal computer. However, along with the increase in the amount of data to be dealt with, the capacity thereof has become insufficient and the increase of the capacity of the floppy disc has been demanded.

Magnetic layers comprising an iron oxide, a Co-modified iron oxide, $CrO_2$, a ferromagnetic metal powder, or a hexagonal ferrite powder dispersed in a binder, which are coated on a support have been conventionally widely used in magnetic recording media. Ferromagnetic metal powders and hexagonal ferrite powders among these have been known to have excellent high density recording characteristics.

In the case of a disc, as high capacity discs using ferromagnetic metal powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and properties. As is the circumstance, various attempts have been made to improve high density recording characteristics. The following fact as to the orientation of magnetic powders has been found recently during the course of the development.

It is important that the acicular ratio of the ferromagnetic powder itself is made high to realize a high coercive force by the anisotropy in configuration, and when the magnetic recording medium is a tape-like medium, the degree of magnetic orientation of the magnetic layer itself is heightened in the same direction with the running direction of the head, and when the medium is a rotating recording medium such as a floppy disc, as recording is digital recording, it is important to reduce the output fluctuation in a circumferential direction as far as possible rather than increase the output, therefore, the magnetic orientation in the magnetic layer should be random orientation not having anisotropy (the orientation ratio is made nearer to 1).

For example, the following methods have been suggested.

JP-A-6-36261 (the term "JP-A" as used herein means an "unexamined published Japanese patent application") discloses a recording medium comprising a lower nonmagnetic layer and a thin magnetic layer by using the ATOMM (Advanced Super Thin Layer & High Output Metal Media Technology) in which the orientation ratio in the in-plane and the vertical direction of 0.85 or more and the squareness ratio in the vertical direction of from 0.3 to 0.65 can be obtained by conducting non-orientation and oblique orientation while the layer is in wet state. This method provides a magnetic disc having a uniform and high output in a circumferential direction and excellent overwriting characteristics as compared with conventional discs produced by non-orientation processes, and the method for producing the same. However, the long axis length and the crystallite size of the ferromagnetic metal powders used in the examples of JP-A-6-36261 are 0.20 μm and 195 Å, respectively, which are large.

U.S. Pat. No. 4,923,766 discloses a method of conducting random orientation immediately after the orientation in the vertical direction. The patent provides recording media exhibiting less mechanical orientation, high orientation ratio and excellent modulation by conducting random orientation in addition to the vertical orientation. In the examples thereof, metal magnetic powders of a large particle size having a long axis length of 0.25 μm and a high acicular ratio of 10 are used. Magnetic powders of such the magnetic powder having comparatively large particle size and high acicular ratio are liable to be in rows in the plane. However, metal magnetic powders having a small long axis length and a small acicular ratio are not sufficient for orientation conditions for ensuring high S/N ratio which is important for high density recording. Further, the layer constitution comprises a single magnetic layer, which is insufficient for achieving high capacity of magnetic discs.

JP-A-63-171427 discloses a method of orientation comprising orienting ferromagnetic powders in a specific direction of a magnetic field, and then randomly orienting in a weak alternating current magnetic field in almost the orthogonal direction thereto. The magnetic powder used in the examples of JP-A-63-171427 is $\gamma$-$Fe_2O_3$, which is small in the amount of magnetization as compared with metal magnetic powders, therefore, satisfactory electromagnetic characteristics cannot be obtained, and is insufficient for obtaining a high S/N ratio as well.

JP-A-1-105328 discloses a method which comprises orienting magnetic powders in the first place in a transverse direction and then uniformly non-orientating the powders by a solenoid in an alternating current magnetic field. In the method of JP-A-1-105328, the in-plane orientation ratio is surely improved but it is not sufficient for obtaining a high S/N ratio. Further, the layer constitution in the examples of JP-A-1-105328 comprises a single magnetic layer using Fe-based metal magnetic powders, therefore, sufficient electromagnetic characteristics cannot be obtained.

JP-A-5-53009 discloses a method of random orientation which comprises putting a plurality of bar magnets for orientation in parallel at a distance with each other in the traveling direction of the support in such a manner that the magnetic poles of the adjacent magnets facing the support are different and arranged obliquely to the traveling direction of the support with facing converse directions alternately.

For realization of high density recording, it is important to make a particle size of a magnetic powder smaller. If a particle size is made small, the width of the particle is spontaneously limited and the length of the particle becomes inevitably short, i.e., the particle has a small acicular ratio.

For example, a problem has arisen during the development of a floppy disc having a high capacity in a recording/reproduction system requiring an areal recording density density of 0.15 G bit/inch$^2$ or more such that noise increases in particular as a particle size of a magnetic powder decreases, and the noise becomes more conspicuous with heightening the coercive force.

However, efficient means for solving this problem could not been found.

SUMMARY OF THE INVENTION

An object of the present invention is to provide a disc-like magnetic recording medium having a high capacity optimum for digital recording and excellent electromagnetic characteristics.

As a result of intensive investigations, the present inventors have found that high-density recording characteristics of high capacity having excellent electromagnetic characteristics and excellent durability can be obtained by the disc-like magnetic recording medium having the constitution described below, thus the present invention has been attained.

That is, the present invention relates to a disc-like magnetic recording medium which comprises a support having thereon a magnetic layer comprising a ferromagnetic powder and a binder as main components, wherein the ferromagnetic powder has an average long axis length of from 0.01 to 0.18 μm, a crystallite size of from 50 to 180 Å, an acicular ratio of from 2 to 9, the magnetic layer has the coercive force Hc of from 1,700 to 3,000 Oe, the in-plane orientation ratio of 0.85 or more, and the squareness ratio in the vertical direction to the surface of the magnetic layer of 0.30 or less.

Further, the present invention preferably relates to a disc-like magnetic recording medium which comprises a support having provided thereon a substantially nonmagnetic lower layer and a magnetic layer comprising a ferromagnetic metal powder dispersed in a binder provided on the lower layer, wherein the ferromagnetic metal powder has an average long axis length of from 0.01 to 0.18 μm, a crystallite size of from 50 to 180 Å, an acicular ratio of from 2 to 9, the magnetic layer has the coercive force Hc of from 1,700 to 3,000 Oe, the in-plane orientation degree of 0.85 or more, and the squareness ratio in the vertical direction to the surface of the magnetic layer of 0.30 or less.

DETAILED DESCRIPTION OF THE INVENTION

Here, the term "a substantially nonmagnetic lower layer" means a lower layer or undercoating layer which may have a magnetic property but not too much for participating in recording and hereinafter referred to as simply "a lower layer" or "a nonmagnetic layer".

Preferred embodiments in a magnetic recording system of the present invention are such that the ferromagnetic powder is a ferromagnetic metal powder, the thickness of the magnetic layer is from 0.02 too 0.5 μm, and the areal recording density required in the magnetic recording system (i.e., the magnetic recording/reproduction system) is from 0.15 to 2.0 G bit/inch².

Areal recording density is the value obtained by multiplying linear recording density by track density.

Linear recording density is a bit number of signals recordable per inch in the recording direction.

These linear recording density, track density and surface recording density are values determined according to the magnetic recording systems.

The present invention relates to a disc-like magnetic recording medium comprising a magnetic monolayer (i.e., a single magnetic layer) and an ATOMM type disc-like magnetic recording medium. Both disc-like magnetic recording media have common factors except that in the ATOMM type disc-like magnetic recording medium of the present invention, a lower layer is provided as an undercoating layer of the magnetic layer, the thickness of the magnetic layer is preferably from 0.02 to 0.5 μm, and the ferromagnetic powder is preferably a ferromagnetic metal powder.

Common factors are the average long axis length of the ferromagnetic powder, the crystallite size of the ferromagnetic powder, the acicular ratio of the ferromagnetic powder, the coercive force (Hc) of the magnetic layer, the in-plane orientation ratio (Or) of the magnetic layer, and the squareness ratio in the vertical direction to the surface of the magnetic layer (SQn), and each of these is specified in the present invention.

The definitions of the average long axis length, the crystallite size and Hc are necessary for ensuring electromagnetic characteristics, in particular, output, and definition of Or and SQn contributes to high S/N ratio and reduction of modulation.

The average long axis length is from 0.01 to 0.18 μm, preferably from 0.04 to 0.15 μm, and more preferably from 0.06 to 0.12 μm. When the average long axis length is more than 0.18 μm, noise of the disc-like magnetic recording media (hereinafter sometimes referred to as "media") increases, which is, therefore, not preferred. While when it is less than 0.01 μm, sufficient dispersion cannot be obtained, as a result, a reducing effect of noise due to finer magnetic powders is not exhibited. On the contrary, the surface roughness of the magnetic layer increases, which is, therefore, not preferred.

The crystallite size is from 50 to 180 Å, preferably from 80 to 160 Å, more preferably from 100 to 150 Å. When the crystallite size is more than 180 Å, the noise of media increases, which is not preferred. While when the crystallite size is less than 50 Å, sufficient dispersion cannot be obtained, as a result, a reducing effect of noise due to finer magnetic powders is not exhibited and conversely the surface roughness of the magnetic layer increases, which is, therefore, not preferred.

The acicular ratio is from 2 to 9, preferably from 4 to 7. When the acicular ratio is more than 9, the packing density of the magnetic layer is reduced and the reproduction output is lowered. Further, increase of the noise of media is caused, which is, therefore not preferred. When the acicular ratio is less than 2, a sufficient coercive force cannot be secured, which is, therefore, not suitable for high density recording. Further, a magnetic powder is liable to be randomly oriented three-dimensionally and perpendicularly magnetized components increase and noise increases.

Hc (of the magnetic layer) is from 1,700 to 3,000 Oe, preferably from 1,800 to 2,700 Oe, more preferably from 2,000 to 2,500 Oe. If Hc is less than 1,700 Oe, recording of high linear recording density is insufficient and satisfactory characteristics as high capacity media cannot be obtained. On the contrary, if Hc is more than 3,000 Oe, sufficient recording of signals by a present magnetic head is unable, which is, therefore, not preferred.

Or (i.e., in-plane orientation of the magnetic layer) is 0.85 or more, preferably 0.90 or more, more preferably 0.95 or more, and ideally 1. When Or is less than 0.85, modulation is less than permissible limit and an error rate increases.

SQn is 0.30 or less, preferably 0.28 or less, and more preferably from 0.26 to 0.15.

Means for regulating Or and SQn are not particularly limited, but regulating the orientation of a ferromagnetic powder is preferred means.

Preferred are the following orientating methods.
(1) A magnetic layer is coated in the machine direction of the support by ordinary methods and alternating current magnetic field is applied before the magnetic layer is dried and solidified to conduct random orientation.
(2) Magnetic force lines are applied in the traveling direction of the support by the same pole and counter magnets before the magnetic layer is dried and solidified and orientation is conducted in the machine direction, and then alternating current magnetic field is applied to conduct random orientation.

(3) A plurality of the same pole and counter magnets are arranged obliquely to the traveling direction of the support with facing converse directions alternately before the magnetic layer is dried and solidified to conduct random orientation.

In the above items (1) to (3), in the case of ATOMM type, coating may be conducted either by wet on dry coating (the magnetic layer is coated after the lower layer is dried, abbreviated to W/D) or wet on wet coating (both magnetic and lower layers are wet, abbreviated to W/W).

In the case of the above item (1), alternating current frequency is preferably from 20 to 200 Hz, more preferably from 40 to 100 Hz and magnetic field intensity is preferably from 50 to 3,000 Oe, more preferably from 200 to 1,000 Oe.

In the case of the above item (2), magnetic field intensity of the gap center of the orientation in the machine direction is preferably from 1,000 to 8,000 Oe, more preferably from 3,000 to 6,000 Oe. Alternating current frequency of random orientation treatment is preferably from 20 to 200 Hz, more preferably from 40 to 100 Hz and magnetic field intensity is preferably from 50 to 3,000 Oe, more preferably from 200 to 1,000 Oe.

In the case of the above item (3), magnetic field intensity of the gap center is preferably from 1,000 to 8,000 Oe, more preferably from 3,000 to 6,000 Oe. With respect to the direction of the magnet, the acute angle made by the machine (i.e., the longer) direction axis of the support with the machine (i.e., the longer) direction axis of the magnet is preferably from 30 to 60°, more preferably from 40 to 50°. Further, the angle made by the machine direction axes of counter magnets facing conversely each other is preferably from 80 to 100°. The number of pairs of the same pole and counter magnets is preferably from 1 to 3 pairs. "Magnets facing conversely each other" means that, when viewed parallelly to the surface of the support with the machine direction being up and down directions, positions of the two machine direction axes of the magnets are in such relationship as the machine direction axis of one magnet is right side up and another is right side down each to the transverse direction of the support.

The shape and the size of the magnet used in the above items (1) and (2) are not particularly limited but a bar magnet having a length capable of covering the transverse direction of the support is preferred, e.g., one shielded by a yoke.

In the above items (1) to (3), the atmospheric temperature can be arbitrarily-selected but is, in general, selected from the range of from 40 to 120° C.

Orientating methods for regulating Or and SQn are not limited to the above methods and various conventionally well-known methods can be applied.

In the field of personal computers where the tendency of multimedia has been increasingly progressed, high capacity recording media have attracted public attentions in place of conventional floppy discs, e.g., ZIP disc (areal recording density; 96 M bit/inch$^2$) has been on sale from IOMEGA CORP., U.S.A. This is an ATOMM type disc which has been developed by the present inventors, and products of 3.7 inches with the recording capacity of 100 MB or more are on the market. The capacity of from 100 to 120 MB is almost equal to MO (3.5 inches), i.e., one disc has the capacity of recording newspaper articles of from seven to eight month period. A transfer rate indicating write/readout time of data is 2 MB or more per a second, which is equal to a hard disc, and the working speed is 20 times of conventional floppy discs and more than 2 times of the MO, therefore, extremely advantageous. In addition, as this recording medium comprising a lower layer and a magnetic thin layer is the same coating type medium as floppy discs used at present, mass production is feasible, accordingly cheaper than a hard disc and the MO.

As a result of eager investigations based on the knowledges on these media, the present inventors have achieved the present invention of a disc-like magnetic recording medium having areal recording density of from 0.15 to 2.0 G bit/inch$^2$ which has markedly high recording capacity as compared with the above ZIP disc and the MO (3.5 inches).

The present invention preferably relates to a medium whose magnetic layer is an ultrathin layer having a thickness of from 0.02 to 0.5 $\mu$m and contains a ferromagnetic metal powder of ultrafine particles excellent in high output and high dispersibility, and whose lower layer contains spherical or acicular inorganic powders, by thus reducing the thickness of the magnetic layer, a magnetic force offset in the magnetic layer can be reduced, output in the high frequency range can be markedly increased, further, overwriting characteristics can be improved.

By the improvement of a magnetic head, the effect of the ultrathin magnetic layer can be exhibited the more by the combined use with a narrow gap head and thereby digital recording characteristics can be improved.

The thickness of the magnetic thin layer is preferably from 0.02 to 0.5 $\mu$m so as to match the performance required from the magnetic recording system and magnetic head of high density recording. Such a uniform and ultrathin magnetic layer can be attained by high dispersion and high packing density realized by the combined use of a fine magnetic and nonmagnetic powder with a dispersant and a high dispersible binder. The magnetic powders used are preferably ferromagnetic metal powders which are extremely fine particles and capable of achieving high output for inducing ihigh capacity and high output suitabilities as far as possible. Further, those containing a large amount of Co and a sintering inhibitor such as Al and Y compounds can be used. For the realization of high transfer rate, running stability and durability during high speed rotation can be ensured making use of a three dimensional network binder system suitable for an ultrathin magnetic layer. A composite lubricant capable of maintaining the effect during use under various temperature and humidity conditions and in high rotation use can be incorporated into upper and lower layers and, further, with making the lower layer have a role of the tank of the lubricant so as to be able to always supply an appropriate amount of the lubricant to the upper magnetic layer to heighten the durability of the upper magnetic layer to improve the reliance. Cushioning effect of the lower layer can bring about good head touch and stable running property.

Advantages due to ATOMM structure are thought to be as follows.
(1) Improvement of electromagnetic characteristics by the thin layer structure of the magnetic layer
   a) Improvement of the output in a high frequency region by the improvement of recording demagnetization characteristics
   b) Improvement of overwriting characteristics
   c) Security of window margin
(2) High output by smoothing the upper magnetic layer
(3) Easiness of impartation of request functions by functional separation of the magnetic layer
(4) Improvement of durability by a stable supply of lubricants These functions cannot be sufficiently attained only by making a magnetic layer a multilayer structure. To constitute a multilayer structure, a lower layer and an upper layer are coated and, in general, surface treatments such as a curing treatment, a calendering treatment are conducted. In the case of a floppy disc (FD), as different from a magnetic tape, the same treatment are conducted on both surface sides, in general. After a coating step, a disc undergoes a slitting step, a punching step, a shell incorporation step, and a certifying step, thereby finished as a final product. If necessary, after being punched as a disc-like shape, a thermal treatment by high temperature (generally from 50 to 90° C.) to accelerate curing of the coated layer, or a burnishing treatment with an abrasive tape to scrape off the surface protrusions may be conducted.

Durability is an important factor for a magnetic disc. As a means for improving durability of media, there are a binder process to increase the film strength of a disc per se and a means for regulating a lubricant formulation to maintain a sliding property with a magnetic head.

Lubricants are used in combination of a plurality of kinds respectively exhibiting superior effects in various temperature and humidity conditions under which they are used and each lubricant exhibits its function in different temperature (low temperature, room temperature, high temperature) and humidity (low humidity, high humidity) atmospheres, thereby totally stable lubricating effect can be maintained.

By making use of two layer structure, the durability of the upper magnetic layer can be heightened with making the lower layer have a role of the tank of a lubricant capable of always supplying an appropriate amount of a lubricant to the upper magnetic layer.

In addition to the maintaining function of a lubricant, a controlling function of surface electrical resistance can be imparted to the lower layer. For controlling electrical resistance, a solid electrically conductive material such as carbon black is added to a magnetic layer in many cases. Such material not only restricts the increase of the packing density of magnetic powders but also influences the surface roughness of the magnetic layer as the thickness of magnetic layer becomes-thinner. Incorporation of electrically conductive materials in the lower layer can eliminate these defects.

Magnetic Layer

A magnetic layer according to the present invention may be provided on either one surface side of a support or may be provided on both surface sides. A magnetic layer may be provided alone or may be coated on a lower layer. Further, a magnetic layer may comprise a multilayer structure by treatment. In such the case, the thickness of the magnetic layer in the present specification means the total thickness of each magnetic layer. In the case of ATOMM type, either W/W coating or W/D coating is available. The W/W coating is preferred in view of the productivity but the W/D coating is sufficiently usable. In the multilayer structure of the present invention, an upper layer and a lower layer can be formed simultaneously by W/W coating, accordingly, a surface treatment step, e.g., a calendering step, can be utilized effectively and surface roughness of the magnetic layer can be improved even with an ultrathin layer. The coercive force of the magnetic layer is as described above, and the maximum magnetic flux density (Bm) is preferably from 2,000 to 5,000 G.

Ferromagnetic Powder

The ferromagnetic powders which can be used in the present invention are not particularly limited but ferromagnetic metal powders containing α-Fe as a main component are preferably used. These ferromagnetic powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and more preferably at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, the content of Al is preferably from 5 to 30 atomic %, more preferably from 11 to 20 atomic %, and most preferably from 12 to 18 atomic %, each based on Fe.

These ferromagnetic powders may be previously treated with the later described dispersant, lubricant, surfactant, and antistatic agent before dispersion. Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639 (the term "JP-B" as used herein means an "examined Japanese patent publication"), U.S. Pat. Nos. 3,026,215, 3;031,341, 3,100,194, 3,242,005, and 3,389,014.

Ferromagnetic alloy fine powders may contain a small amount of a hydroxide or an oxide. Ferromagnetic alloy fine powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium boronhydride, hypophosphite, or hydrazine, to conduct reduction; and a method comprising evaporating a metal in a low pressure inert gas to obtain a fine powder. The thus-obtained ferromagnetic alloy powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic powders have a coercive force of preferably from 1,700 to 3,500 Oe, and more preferably from 1,800 to 3,000 Oe.

Ferromagnetic powders preferably have a water content of from 0.01 to 2%. The water-content of ferromagnetic powders is preferably optimized by selecting the kinds of binders.

The pH of ferromagnetic powders is preferably optimized by the combination with the binder to be used. The pH range is from 4 to 12, preferably from 6 to 10. Ferromagnetic powders may be surface-treated with Al, Si, P or oxides thereof, if necessary. The amount thereof is from 0.1 to 10% based on the ferromagnetic powders. Adsorption of a lubricant, e.g., aliphatic acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic powders. It is preferred substantially not to contain such the soluble inorganic ions but the properties of ferromagnetic powders are not particularly affected if the content is 200 ppm or less. Ferromagnetic powders for use in the present invention preferably have less voids and the value thereof is 20% by volume or less, more preferably 5% by volume or less. The shape of ferromagnetic powders is not particularly limited, and any shape such as an acicular shape, an ellipsoidal shape or a spindle shape may be used so long as it satisfies the above-described properties as to particle sizes. Switching Field Distribution (SFD) of a ferromagnetic powder itself is preferably small, preferably 0.8 or less. It is necessary to make Hc distribution of a ferromagnetic powder narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in a ferromagnetic metal powder good and preventing sintering are effective methods.

Nonmagnetic Layer

The lower layer is described in detail below. Inorganic powders contained in the lower layer of the present invention are nonmagnetic powders. They can be selected from the following inorganic compounds such as metal oxide, metal carbonate, metal sulfate, metal nitride, metal carbide, metal sulfide, etc. Examples of inorganic compounds are selected from the following compounds and they can be used alone or in combination, e.g., α-alumina having an alpha-conversion of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate because they have small particle size distribution and various means for imparting functions, and more preferred are titanium dioxide and α-iron oxide. Such the nonmagnetic powders preferably have a particle size of from 0.005 to 2 μm. If desired, a plurality of nonmagnetic powders each having a different particle size may be combined, or a single nonmagnetic powder having a broad particle size distribution may be employed so as to attain the same effect as such the combination. A particularly preferred particle size of the nonmagnetic powders is from 0.01 to 0.2 μm. In particular, when the nonmagnetic powder is a granular metal oxide, the average particle size thereof is preferably 0.08 μm or less, and when it is an acicular metal oxide, the long axis length thereof is preferably 0.3 μm or less, more preferably 0.2 μm or less. Nonmagnetic powders for use in the present invention have a tap density of from 0.05 to 2 g/ml, preferably from 0.2 to 1.5 g/ml; a water content of from 0.1 to 5 wt %, preferably from 0.2 to 3 wt %, and more preferably from 0.3 to 1.5 wt %; a pH value of from 2 to 11, particularly preferably between 5.5 and 10; a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 μm, more preferably from 0.04 to 0.1 μm; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic powders may be any of acicular, spherical, polyhedral, or tabular shapes. Nonmagnetic powders preferably have a Mohs' hardness of from 4 to 10. The SA (stearic acid) absorption amount of nonmagnetic powders is from 1 to 20 μmol/m$^2$, preferably from 2 to 15 μmol/m$^2$, and more preferably from 3 to 8 μmol/m$^2$. The pH thereof is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic powders for use in the lower layer according to the present invention include Nanotite (manufactured by Showa Denko Co., Ltd.), HIT-110 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by Toda Kogyo Co., Ltd.), titanium oxide TTO-51B, TTO-55A, TTO-55B, TTO-55C, TTO-55S, TTO-55D, SN-100, α-hematite E-270, E271, E300, and E303 (manufactured by Ishihara Sangyo Kaisha Ltd.), titanium oxide STT-4D, STT-30D, STT-30, STT-65C, and α-hematite α-40 (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEC-Y and DEC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries Ltd.). Particularly preferred nonmagnetic powders are titanium dioxide and α-iron oxide.

By the incorporation of carbon black into the lower layer, a desired micro Vickers' hardness can be obtained in addition to the well-known effects of reducing surface electrical resistance (Rs) and light transmittance. Further, it is also possible to obtain the effect of stocking a lubricant by the incorporation of carbon black into the lower layer. Furnace black for rubbers, thermal black for rubbers, carbon black for coloring, acetylene black, etc. can be used therefor. The carbon black used in the lower layer should optimize the following characteristics by the desired effects and sometimes more effects can be obtained by the combined use.

The carbon black for use in the lower layer according to the present invention has a specific surface area ($S_{BET}$) of from 100 to 500 m$^2$/g, preferably from 150 to 400 m$^2$/g, a DBP absorption of from 20 to 400 ml/100 g, preferably from 30 to 400 ml/100 g, an average particle size of from 5 to 80 mμ, preferably from 10 to 50 mμ, and more preferably from 10 to 40 mμ, pH of from 2 to 10, a water content of from 0.1 to 10%, and a tap density of from 0.1 to 1 g/ml. Specific examples of carbon blacks for use in the present invention include BLACKPEARLES 2000, 1300, 1000, 900, 800, 880 and 700 and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). The carbon black for use in the present invention may previously be surface-treated with a dispersant, may be grafted with a resin, or a part of the surface thereof may be graphitized before use. The carbon black may be previously dispersed in a binder before addition to the magnetic coating solution. Carbon black can be used within the range not exceeding 50% by weight based on the above inorganic powders and not exceeding 40% by weight based on the total weight of the nonmagnetic layer. Carbon black can be used alone or in combination. Regarding carbon blacks for use in the present invention, for example, the disclosure in *Handbook of Carbon Blacks* (edited by Carbon Black Association of Japan) may be referred to.

Organic powders can be used in the lower layer according to the purpose. Examples of such the organic powders include an acryl styrene resin powder, a benzoguanamine resin powder, a melamine resin powder, and a phthalocyanine pigment. In addition, at least one of a polyolefin resin powder, a polyester resin powder, a polyamide resin powder, a polyimide resin powder, and a polyethylene fluoride resin powder can also be used. The producing methods thereof are disclosed in JP-A-62-18564 and JP-A-60-255827.

Binder resins, lubricants, dispersants, additives, solvents, dispersing methods, etc., used for the magnetic layer described below can be used in the lower layer. In particular, with respect to the amounts and the kinds of binder resins, additives, the amounts and the kinds of dispersants, well-known prior art techniques regarding the magnetic layer can be applied in the lower layer.

Binder

Conventionally well-known thermoplastic resins, thermosetting resins, reactive resins and mixtures of these resins are used as a binder in the present invention.

Thermoplastic resins having a glass transition temperature of from $-100$ to $150°$ C., a number average molecular weight of from 1,000 to 200,000, preferably from 10,000 to 100,000, a polymerization degree of about 50 to 1,000 can be used in the present invention. Examples thereof include polymers or copolymers containing as a constituting unit the following compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resin and isocyanate prepolymer, mixtures of polyesterpolyol and polyisocyanate, and mixtures of polyurethane and polyisocyanate. The details for these resins are described in *Plastic Handbook*, published by Asakura Shoten. It is also possible to use well-known electron beam curable type resins in each layer. Examples of these resins and producing methods are disclosed in detail in JP-A-62-256219. These resins can be used alone or in combination. Examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, etc. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$^2$, —N$^+$R$_3$ (R represents a hydrocarbon group), an epoxy group, —SH, or —CN. The content of the polar group is from about $10^{-1}$ to $10^{-8}$ mol/g, preferably from $10^{-2}$ to $10^{-6}$ mol/g.

That is, the binders of the present invention is preferably a polar group-containing resin.

Specific examples of binders for use in the present invention include VAGH, VYHH, VMCH, VAGF, VAGD, VROH, VYES, VYNC, VMCC, XYHL, YXSG, PKHH, PKHJ, PKHC, and PKFE (manufactured by Union Carbide Co., Ltd.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, DX80, DX81, DX82, DX83, and 100FD (manufactured by Electro Chemical Industry Co., Ltd.), MR-104, MR-105, MR-110, MR-100, MR-555, 400X-110A (manufactured by Nippon Zeon Co., Ltd.), Nippollan N2301, N2302, and N2304 (manufactured by Nippon Polyurethane Co., Ltd.), Pandex T-5105, T-R3080, T-5201, Burnock D-400, D-210-80, Crisvon 6109 and 7209 (manufactured by Dainippon and Chemicals, Ink), Vylon UR8200, UR8300, UR8700, RV530, and RV280 (manufactured by Toyobo Co., Ltd.), Daipheramine 4020, 5020, 5100, 5300, 9020, 9022, and 7020 (manufactured by Dainichi Seika K.K.), MX5004 (manufactured by Mitsubishi Kasei Corp.), Sunprene SP-150 (manufactured by Sanyo Chemical Industries Co. Ltd.), Salan F310 and F210 (manufactured by Asahi Chemical Industry Co., Ltd.), etc.

The amount of the binder for use in the nonmagnetic layer and the magnetic layer according to the present invention is from 5 to 50 wt %, preferably from 10 to 30 wt %, based on the amount of the nonmagnetic powder or the ferromagnetic powder. When a vinyl chloride resin is used, the amount thereof is from 5 to 30 wt %, and when a polyurethane resin is used, the amount of the polyurethane resin is from 2 to 20 wt % and also it is preferred to use from 2 to 20 wt % of a polyisocyanate in combination. However, for instance, when head corrosion is caused by a slight amount of dechlorination, it is possible to use only polyurethane or only polyurethane and polyisocyanate. When polyurethane is used in the present invention, the polyurethane has a glass transition temperature of from $-50$ to $150°$ C., preferably from 0 to $100°$ C., breaking extension of from 100 to 2,000%, breaking stress of from 0.05 to 10 kg/mm$^2$, and a yielding point of from 0.05 to 10 kg/mm$^2$.

The magnetic recording medium according to the present invention may comprise two or more layers. Accordingly, the amount of the binder, the amount of vinyl chloride resins, polyurethane resins, polyisocyanate or other resins contained in the binder, the molecular weight of each resin constituting the magnetic layer, the amount of polar groups, or the above-described physical properties of resins can of course be varied in the nonmagnetic layer and the magnetic layer, according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to impart flexibility.

Examples of the polyisocyanates which can be used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinedi-isocyanate, isophoronediisocyanate, and triphenylmethanetriisocyanate, reaction products of the above-described isocyanates with polyalcohols, and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate-D-200, Takenate D-202 (manufactured by Takeda Chemical Industries, Ltd.), and Desmodur L, Desmodur IL, Desmodur N, and Desmodur HL (manufactured by Sumitomo Bayer Co., Ltd., Japan). These may be used alone or in combinations of two or more thereof, taking advantage of a difference in curing reactivity in each layer.

Carbon Black, Abrasive

Examples of carbon blacks for use in the magnetic layer of the present invention include furnace black for rubbers, thermal black for rubbers, carbon black for coloring, acetylene black, etc. The carbon black for use in the magnetic layer of the present invention preferably has a specific surface area ($S_{BET}$) of from 5 to 500 m$^2$/g, a DBP absorption of from 10 to 400 ml/100 g, an average particle size of from 5 to 300 mμ, pH of from 2 to 10, a water content of from 0.1 to 10%, and a tap density of from 0.1 to 1 g/ml. Specific examples of carbon blacks for use in the magnetic layer of the present invention-include BLACKPEARLES 2000, 1300, 1000, 900, 905, 800 and 700 and VULCAN XC-72 (manufactured by Cabot Co., Ltd.), #80, #60, #55, #50 and #35 (manufactured by Asahi Carbon Co.), #2400B, #2300, #900, #1000, #30, #40 and #10B (manufactured by Mitsubishi Kasei Corp.), CONDUCTEX SC, RAVEN 150, 50, 40 and 15, RAVEN-MT-P (manufactured by Columbia Carbon Co., Ltd.), and Ketjen Black EC (manufactured by Akzo Co., Ltd.). The carbon black for use in the present invention may previously be surface-treated with a dispersant, may be grafted with a resin, or a part of the surface thereof may be graphitized before use. The carbon black may be previously dispersed in a binder before addition to the magnetic coating solution. Carbon black may be used alone or in combination. Carbon black is preferably used in an amount of from 0.1 to 30 wt % based on the amount of the ferromagnetic powder. Carbon black can serve various functions such as preventing static charges, reducing a friction coefficient, imparting a light-shielding property and improving a film strength. Such functions vary depending upon the kind of the type of carbon black to be used. Accordingly, it is of course possible in the present invention to select and determine the kinds of the carbon blacks to be added to the magnetic layer and the lower layer, as well as the respective amounts and combinations thereof on the basis of the above mentioned various properties such as the grain size, the oil absorption amount, the electroconductivity and the pH value, or should be rather optimized in respective layers. Regarding carbon blacks for use in the magnetic layer of the present invention, for example, the disclosure in *Handbook of Carbon Blacks* (edited by Carbon Black Association of Japan) can be referred to.

As the abrasive usable in the present invention, well-known materials essentially having a Mohs' hardness of 6 or more may be used alone or in combination. Examples of such the abrasives include α-alumina having an alpha-conversion of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in the abrasives, but the intended effect can be attained so far as the content of the main component is 90% or more. Abrasives preferably have a particle size of from 0.01 to 2 μm. In particular, for improving electromagnetic characteristics, abrasives having narrow particle size distribution are preferred. For improving durability, a plurality of abrasives each having a different grain size may be combined according to necessity, or a single abrasive having a broad grain size distribution may be employed so as to attain the same effect as such a combination. Preferably, abrasives for use in the present invention have a tap density of from 0.3 to 2 g/ml, a water content of from 0.1 to 5%, a pH value of from 2 to 11 and a specific surface area ($S_{BET}$) of from 1 to 30 m$^2$/g. The shape of the abrasives to be used in the present invention may be any of acicular, spherical and die-like shapes. Preferably, the abrasive has a shape partly with edges, because a high abrasive property is given. Specific examples of abrasives for use in the present invention include AKP-12, AKP-15, AKP-20, AKP-30, AKP-50, HIT-20, HIT-30, HIT-55, HIT-60, HIT-70, HIT-80, and HIT-100 (manufactured by Sumitomo Chemical Co., Ltd.), ERC-DBM, HP-DBM, and HPS-DBM (manufactured by Reynolds International Inc.), WA10000 (manufactured by Fujimi Kenma K.K.), UB20 (manufactured by Uemura Kogyo K.K.), G5, Kromex U2, and Kromex U1 (manufactured by Nippon Chemical Industrial Co., Ltd.), TF100 and TF140 (manufactured by Toda Kogyo Co., Ltd.), β-Random and Ultrafine (manufactured by Ibiden Co., Inc.), and B-3 (manufactured by Showa Mining Co., Ltd.). These abrasives may be added to a nonmagnetic layer, if necessary. By incorporating abrasives into a nonmagnetic layer, it is possible to control the surface shape or prevent abrasives from protruding. Particle sizes and amounts to be added to a magnetic layer and a lower layer should be selected independently at optimal values.

Additive

As additives which can be used in the magnetic layer and the nonmagnetic layer of the present invention, those having a lubricating effect, an antistatic effect, a dispersing effect and a plasticizing effect may be used. Examples of additives which can be used in the present invention include molybdenum disulfide, tungsten disulfide, graphite, boron nitride, graphite fluoride, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, α-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

Specific examples of fatty acids for such the additives include capric acid, caprylic acid, lauric acid, myristic acid, palmitic acid, stearic acid, behenic acid, oleic acid, elaidic acid, linolic acid, linolenic acid, and isostearic acid. Examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucic acid, neopentyl glycol didecanoate, and ethylene glycol dioleate, and examples of alcohols for the additives include oleyl alcohol, stearyl alcohol and lauryl alcohol. Additionally, examples of other additives which may be used include nonionic surfactants such as alkylene oxides, glycerols, glycidols or alkylphenol-ethylene oxide adducts; cationic surfactants such as cyclic amines, ester amides, quaternary ammonium salts, hydantoin derivatives, heterocyclic compounds, phosphoniums or sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols or alkylbetains. The details of these surfactants are described in *Handbook of Surfactants* (published by Sangyo Tosho Co., Ltd.). These lubricants and antistatic agents may not always be 100% pure and may contain impurities such as isomers, non-reacted materials, byproducts, decomposed products and oxides, in addition to the main component. However, the content of such impurities is preferably 30% or less, more preferably 10% or less.

Lubricants and surfactants for use in the present invention respectively have different physical functions. The kinds, amounts and proportions of combination generating synergistic effect of these lubricants should be determined optimally in accordance with the purpose. The nonmagnetic layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in the lower layer is made larger so as to improve the lubricating effect of the surface thereof. Examples are by no means limited thereto. In general, the total amount of the lubricants is from 0.1 to 50%, preferably from 2 to 25%, based on the amount of the ferromagnetic powder or the nonmagnetic powder.

All or a part of the additives to be used in the present invention may be added to the magnetic coating solution or the nonmagnetic coating solution in any step of the preparation. For example, additives may be blended with a magnetic powder before the kneading step, may be added during the step of kneading a magnetic powder, a binder and a solvent, may be added during the dispersing step, may be added after the dispersing step, or may be added immediately before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment or after the completion of slitting.

Well-known organic solvents can be used in the present invention, for example, organic solvents disclosed in JP-6-68453 can be used.

Layer Construction

In each the layer in the layer construction of the magnetic recording medium of the present invention, for example, the thickness of the support is from 2 to 100 μm, preferably from 10 to 80 μm, and when the magnetic layer is a single layer, the thickness of the magnetic layer is preferably from 0.02 to 2.0 μm, more preferably from 0.02 to 0.5 μm.

An under coating layer (i.e., a lower layer) may be provided between the support and the nonmagnetic or magnetic layer for adhesion improvement. The thickness of this under coating layer (i.e., a lower layer) is from 0.01 to 0.5 μm, preferably from 0.02 to 0.5 μm.

When the magnetic layer is provided on only one side of the support, a back coating layer may be provided on the surface side opposite to the magnetic layer-coated surface side for the purpose of static charge prevention or curling correction. The thickness of this back coating layer is from 0.1 to 4 μm, preferably from 0.3 to 2.0 μm. Well-known under coating layers and back coating layers can be used for this purpose.

The thickness of the magnetic layer in the magnetic recording medium of the present invention is optimally selected according to the saturation magnetization amount of the head used, the head gap length, and the recording signal zone. The magnetic layer may comprise two or more layers each having different magnetic characteristics and well-known multilayer magnetic layer constitution can be applied.

The thickness of the lower nonmagnetic layer of the medium according to the present invention is generally from 0.2 to 5.0 μm, preferably from 0.3 to 3.0 μm, and more preferably from 1.0 to 2.5 μm. The lower layer of the recording medium of the present invention exhibits the effect of the present invention so long as it is substantially a nonmagnetic layer even if, or intendedly, it contains a small amount of a magnetic powder as an impurity, which is as a matter of course regarded as essentially the same construction with the present invention. The term "substantially nonmagnetic layer" means that the residual magnetic flux density of the lower layer is 300 G or less and the coercive force is 300 Oe or less, preferably the residual magnetic flux density and the coercive force are zero.

Support

As the support for use in the present invention, well-known films such as polyesters (e.g., polyethylene terephthalate or polyethylene naphthalate), polyolefins, cellulose triacetate, polycarbonate, polyamide, polyimide, polyamideimide, polysulfone, polyaramide, aromatic polyamide, or polybenzoxazole can be used. Highly strong supports such as polyethylene naphthalate or polyamide are preferably used. If necessary, a lamination type support as disclosed in JP-A-3-224127 can be used to vary the surface roughnesses of the magnetic layer surface and the base surface. The support may be previously subjected to surface treatments, such as a corona discharge treatment, a plasma treatment, an adhesion assisting treatment, a heat treatment, and a dust removing treatment. Aluminum or glass substrate can be used as a support in the present invention.

For attaining the object of the present invention, it is preferred to use the support having a central plane average surface roughness (SRa) of 8.0 nm or less, preferably 4.0 nm or less, more preferably 2.0 nm or less, measured by "TOPO-3D" (a product of WYKO Co., Ltd., U.S.A.) by MIRAU method. It is preferred that the support not only has a small central plane average surface roughness but also is free from coarse protrusions (having a height) of 0.5 μm or more. Surface roughness configuration is freely controlled by the size and the amount of fillers added to the support. Examples of such the fillers include oxides or carbonates of Ca, Si and Ti, as well as acryl-based organic fine powders. The support for use in the present invention preferably has the maximum height (SRmax) of 1 μm or less, ten point average roughness (SRz) of 0.5 μm or less, central plane peak height (SRp) of 0.5 μm or less, central plane valley depth (SRv) of 0.5 μm or less, central plane area factor (SSr) of from 10% to 90%, and average wavelength (Sλa) of from 5 μm to 300 μm. For obtaining desired electromagnetic characteristics and durability, surface protrusion distribution of the support can be controlled arbitrarily by fillers, e.g., a number of protrusions having sizes of from 0.01 μm to 1 μm can be controlled each within the range of from 0 to 2,000 per 0.1 mm$^2$.

F-5 value of the support for use in the present invention is preferably from 5 to 50 kg/mm$^2$, a thermal shrinkage factor of the support at 100° C. for 30 minutes is preferably 3% or less, more preferably 1.5% or less, and a thermal shrinkage factor at 80° C. for 30 minutes is preferably 1% or less, more preferably 0.5% or less. The support has a breaking strength of from 5 to 100 kg/mm$^2$, an elastic modulus of from 100 to 2,000 kg/mm$^2$, a temperature expansion coefficient of from $10^{-4}$ to $10^{-8}$/°C., preferably from $10^{-5}$ to $10^{-6}$/°C., and a humidity expansion coefficient of $10^{-4}$/RH % or less, preferably $10^{-5}$/RH % or less. These thermal characteristics, dimensional characteristics and mechanical strength characteristics, are preferably almost equal in each direction of in-plane of the support with the difference of 10% or less.

Producing Method

The process of preparing the magnetic layer-coating solutions for the magnetic recording medium of the present invention comprises at least a kneading step, a dispersing step and optionally blending steps to be carried out before and/or after the kneading and dispersing steps. Any of these respective steps may be composed of two or more separate stages. Materials such as a magnetic powder, a nonmagnetic powder, a binder, carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion. For achieving the object of the present invention, the above steps can be performed partly with conventional techniques. Powerful kneading machines such as an open kneader, a continuous kneader, a pressure kneader or an extruder is preferably used in a blending step. When a kneader is used, all or a part of binders (preferably 30% or more of the total binders) are kneading-treated in the range of from 15 parts to 500 parts per 100 parts of the magnetic powders or nonmagnetic powders together with the magnetic powders or nonmagnetic powders. Details of these kneading are disclosed in JP-A-1-106338 and JP-A-1-79274. When dispersing a magnetic layer solution and a nonmagnetic layer solution, glass beads can be used but dispersing media having a high specific gravity is preferably used and zirconia beads, titania beads and steel beads are very suitable for this purpose. Optimal particle size and packing density of these dispersing media should be selected. Known dispersing apparatus can be used in the present invention.

The following methods are preferably used for obtaining the magnetic recording medium having a multilayer construction of the present invention. As the first method, the lower layer is coated by any of gravure coating, roll coating, blade coating, and extrusion coating apparatuses, which are ordinarily used in the coating of a magnetic coating solution, and the upper layer is coated while the lower coating layer is still wet by means of the support pressing type extrusion coating apparatus disclosed in JP-B-1-46186, JP-A-60-238179 and JP-A-2-265672. As the second method, the upper layer and the lower layer are coated almost simultaneously using the coating head equipped with two slits for feeding coating solution as disclosed in JP-A-63-88080, JP-A-2-17971 and JP-A-2-265672. And as the third method, the upper layer and the lower layer are coated almost simultaneously using the extrusion coating apparatus equipped with a backup roll as disclosed in JP-A-2-174965. For preventing the deterioration of the electromagnetic characteristics of the magnetic recording medium due to agglomeration of magnetic powders, it is preferred to impart shear to the coating solution in the coating head by methods as described in JP-A-62-95174 and JP-A-1-236968. With respect to the viscosity of the coating solution, the range of the numeric values disclosed in JP-A-3-8471 is necessary to be satisfied. For realizing the constitution of the present invention, successive multilayer coating method in which the magnetic layer is coated on the lower layer after the lower layer is coated and dried can of course be used without impairing the effect of the present invention. However, for reducing coating defects and improving quality, e.g., dropout, it is preferred to use the above simultaneous multilayer coating method.

In orientation, it is preferred that the drying position of the coated film can be controlled by controlling the temperature and the amount of drying air and coating rate. Coating rate is from 20 m/min. to 1,000 m/min. and the temperature of drying air is preferably 60° C. or more. Preliminary drying can be performed appropriately before entering the magnet zone.

Use of heat resisting plastic rolls such as epoxy, polyimide, polyamide and polyimideamide, or metal rolls is effective for calendering treatment. Metal rolls are also usable for the treatment when magnetic layers are coated on both surface sides. Temperature of treatment is preferably 50° C. or more, more preferably from 100° C. or more. Line pressure is preferably from 200 kg/cm or more, more preferably 300 kg/cm or more.

Physical Properties

The disc-like magnetic recording medium according to the present invention has a surface inherent resistivity of preferably from $10^4$ to $10^{12}$ Ω/sq and charge potential of from −500 V to +500 V. Also, in the-medium of the present invention, the elastic modulus at 0.5% elongation of the magnetic layer is preferably from 100 to 2,000 kg/mm$^2$ both in each direction of in-plane, the breaking strength is preferably from 10 to 70 kg/cm$^2$, the elastic modulus of the magnetic recording medium is preferably from 100 to 1,500 kg/mm$^2$ both in each direction of in-plane, the residual elongation is preferably 0.5% or less, and the thermal shrinkage factor at every temperature of 100° C. or less is preferably 1% or less, more preferably 0.5% or less, and most preferably 0.1% or less. The residual amount of solvent in the magnetic layer is preferably 100 mg/m$^2$ or less, more preferably 10 mg/m$^2$ or less. The void ratio is preferably 30% by capacity or less, more preferably 20% by capacity or less, in both of the lower layer and the magnetic layer. The void ratio is preferably smaller but in some cases a specific value is preferably secured depending on purposes. As repeating use is valued, large void ratio contributes to obtaining good running durability in many cases.

The magnetic layer preferably has a central plane surface roughness (Ra) of 4.0 nm or less, preferably 3.8 nm or less, more preferably 3.5 nm or less, measured by "TOPO-3D" by MIRAU method. The magnetic layer for use in the present invention preferably has the maximum height (SRmax) of 0.5 μm or less, ten point average roughness (SRz) of 0.3 μm or less, central plane peak height (SRp) of 0.3 μm or less, central plane valley depth (SRv) of 0.3 μm or less, central plane area factor (SSr) of from 20% to 80%, and average wavelength (Sγa) of from 5 μm to 300 μm. For obtaining desired electromagnetic characteristics and a friction coefficient, a number of surface protrusion of the magnetic layer having sizes (i.e., height) of from 0.01 μm to 1 μm can be controlled arbitrarily within the range of from 0 to 2,000 by controlling the surface property due to fillers in the support, the particle size and the amount of the magnetic powders added to the magnetic layer, or by the surface shape of rolls of calender treatment. The range of curling is preferably within ±3 mm.

When the magnetic recording medium according to the present invention comprises a nonmagnetic layer and a magnetic layer, these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

Preparation of Coating Solution

Magnetic Coating Solution

| | |
|---|---|
| Ferromagnetic metal fine powder<br>Composition: Fe, 70%, Co, 30%<br>Hc, crystallite size, length of long<br>axis, acicular ratio: see Tables 1 and 2<br>σ$_s$: 150 emu/g<br>Sintering inhibitor<br>Al compound (Al/Fe, atomic ratio: 14%)<br>Y compound (Y/Fe, atomic ratio: 7%) | 100 parts |
| Vinyl chloride copolymer<br>MR110, (manufactured by Nippon Zeon<br>Co., Ltd., Japan) | 10 parts |
| Polyurethane resin<br>UR 8200 (manufactured by Toyobo Co., Ltd.) | 4 parts |
| α-Alumina<br>HIT55 (manufactured by Sumitomo Chemical<br>Co., Ltd.) | 5 parts |
| Carbon black<br>#50 (manufactured by Asahi Carbon Co., Ltd.) | 1 part |
| Phenylphosphonic acid | 3 parts |
| Butyl stearate | 3 parts |
| Butoxyethyl stearate | 3 parts |
| Ethylene glycol dioleate | 6 parts |
| Stearic acid | 1 part |
| Oleic acid | 1 part |
| Methyl ethyl ketone | 140 parts |
| Cyclohexanone | 200 parts |

Nonmanetic Coating Solution 1

| | |
|---|---|
| Nonmagnetic powder, TiO$_2$, crystal system rutile<br>Average primary particle size: 0.035 μm<br>S$_{BET}$: 40 m$^2$/g<br>pH: 7<br>TiO$_2$ content: 90% or more<br>DBP oil absorption: 27 to 38 ml/100 g<br>Surface-covering compound: Al$_2$O$_3$, SiO$_2$ | 100 parts |
| Carbon black<br>Ketjen Black EC (manufactured by Akzo Co., Ltd.) | 13 parts |
| Vinyl chloride copolymer<br>MR110 (manufactured by Nippon Zeon Co., Ltd.) | 17 parts |
| Polyurethane resin<br>UR 8600 (manufactured by Toyobo Co., Ltd.) | 6 parts |
| Phenylphosphonic acid | 3 parts |
| Ethylene glycol dioleate | 8 parts |
| n-Butyl stearate | 4 parts |
| Butoxyethyl stearate | 4 parts |
| Oleic acid | 1 part |
| Stearic acid | 1 part |
| Methyl ethyl ketone | 120 parts |
| Cyclohexanone | 180 parts |

Nonmagnetic Coating Solution 2

| | |
|---|---|
| Nonmagnetic powder, α-Fe$_2$O$_3$, hematite<br>Length of long axis: 0.15 μm<br>S$_{BET}$: 50 m$^2$/g<br>pH: 9<br>Surface-covering compound: Al$_2$O$_3$, 8 wt % | 100 parts |
| Carbon black<br>CONDUCTEX SC-U (manufactured by<br>Columbia Carbon Co., Ltd.) | 18 parts |
| Vinyl chloride copolymer<br>MR110 (manufactured by Nippon Zeon Co., Ltd.) | 16 parts |
| Polyurethane resin<br>UR 8200 (manufactured by Toyobo Co., Ltd.) | 7 parts |
| Phenylphosphonic acid | 4 parts |
| Ethylene glycol dioleate | 8 parts |
| Butoxyethyl stearate | 4 parts |
| n-Butyl stearate | 4 parts |
| Stearic acid | 1 part |
| Oleic acid | 1 part |
| Cyclohexanone | 200 parts |
| Methyl ethyl ketone | 140 parts |

Preparation Method 1

The above compositions of the coating solutions for the magnetic layer and the nonmagnetic layers were respectively blended in a kneader, then dispersed with a sand mill. Polyisocyanate was added to each resulting dispersion solution, that is, 13 parts to nonmagnetic coating solution 1 for nonmagnetic layer 1, 6 parts to nonmagnetic coating solution 2 for nonmagnetic layer 2, and 4 parts to magnetic coating solution for magnetic layer. Further, 30 parts of cyclohexanone was added to each solution. Each solution was filtered through a filter having an average pore diameter of 1 μm to obtain coating solutions for forming the nonmagnetic layers and the magnetic layer.

These coating solutions were simultaneously multilayer-coated on a polyethylene terephthalate support having a thickness of 62 μm and a central plane average surface roughness of 3 nm of the surface side on which a magnetic layer was to be coated. The nonmagnetic (layer) coating solution was coated in a dry thickness of 1.5 μm, immediately thereafter, the magnetic (layer) coating solution was coated on the coated nonmagnetic layer while the nonmagnetic layer was still wet so as to give the magnetic layer having a thickness of 0.15 μm. Magnetic powders were randomly oriented according to the orientation conditions 1 to 3 shown below while both layers were still wet. After drying, the coated layer was subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch lined cartridge (A zip-disc cartridge manufactured by-Iomega Co., Ltd., U.S.A.), and equipped the cartridge with prescribed mechanism parts to obtain a 3.7 inch floppy disc.

Preparation Method 2

In the same manner as in preparation method 1, a magnetic layer-forming coating solution and a nonmagnetic layer-forming coating solution were prepared. The obtained coating solution for the nonmagnetic layer was coated in a dry thickness of 1.5 μm on a polyethylene terephthalate support having a thickness of 62 μm and a central plane average surface roughness of 3 nm and dried, then the coating solution for the magnetic layer was coated on the nonmagnetic layer so as to give the magnetic layer having a thickness of 0.15 μm. Magnetic powders were randomly oriented according to the orientation conditions 1 to 3 shown below while the magnetic layer was still wet. After drying, the coated layer was subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch lined cartridge (A zip-disc cartridge manufactured by Iomega Co., Ltd., U.S.A.), and equipped the cartridge with prescribed mechanism parts to obtain a 3.7 inch floppy disc.

Preparation Method 3

The magnetic layer-forming coating solution obtained in the same manner as in preparation method 1 was coated in a dry thickness of 0.3 μm on a polyethylene terephthalate support having a thickness of 62 μm and a central plane average surface roughness of 3 nm. Magnetic powders were randomly oriented according to the orientation conditions 1 to 3 shown below while the magnetic layer was still wet. After drying, the coated layer was subjected to calendering treatment with calenders of 7 stages at 90° C. at line pressure of 300 kg/cm. The obtained web was punched to a disc of 3.7 inches, the disc was subjected to a surface treatment by abrasives, encased in 3.7 inch lined cartridge (A zip-disc cartridge manufactured by Iomega Co., Ltd., U.S.A.), and equipped the cartridge with prescribed mechanism parts to obtain a 3.7 inch floppy disc.

Orientation Condition 1

The magnetic layer is passed through an alternating current magnetic field generator at frequency of 50 Hz and magnetic field strength of 250 Gauss.

Orientation Condition 2

Co magnets with the same pole and counter positions are disposed in such a manner that the magnetic field strength of the gap center becomes the value shown in Tables 1 and 2 and machine direction orientation is conducted, then the magnetic layer is passed through the above alternating current magnetic field generator.

Orientation Condition 3

A plurality of the same pole and counter position Co magnets are disposed obliquely to the traveling direction of the support with facing converse directions alternately and the magnetic layer is subjected to random orientation in place of using the alternating current magnetic field generator. The number of the same pole and counter position Co magnets disposed and the magnetic field strength of the gap center are shown in Tables 1 and 2.

Obtained samples were evaluated as described below and the results obtained are shown in Tables 1 and 2.

Electromagnetic Characteristics

Measurement of Output and S/N

Output and S/N were measured using "RWA1001" type disc evaluation apparatus (a product of GUZIK Co., Ltd., U.S.A.) and "Spin Stand LS-90" (Kyodo Denshi System Co., Ltd.). Reproduction output (TAA) at linear recording density of 90 KFCI and the noise level after DC erasure were measured using a metal-in-gap head having a gap length of 0.3 μm at the position of radius of 24.6 mm, and output and S/N values were obtained therefrom.

Measurement of Modulation

The same conditions and apparatuses were used as in the reproduction output measurement. Modulation was measured from the maximum value (Vmax) and the minimum value (Vmin) in one circle of reproduction wave form according to the following equation:

$$[(Vmax-Vmin)/(Vmax+Vmin)] \times 100(\%)$$

Measurement of Hc and Sqn of Magnetic Layer

Hc and Sqn were measured using a vibrating sample magnetometer (a product of Toei Kogyo K.K.) at Hm 10 KOe. Further, diamagnetism correction was not conducted as to Sqn.

Measurement of Or of Magnetic Layer

Magnetic field was applied in the horizontal direction of the sample to be measured using a vibrating sample magnetometer (a product of Toei Kogyo K.K.) at Hm 10 Koe. By rotating the magnetic field, the squareness ratio was gotten at every 10° from 0° to 360°. The value obtained by dividing the minimum value of the squareness ratio by the maximum value was taken as the orientation ratio.

TABLE 1

| | Characteristics of Magnetic Powder | | | | | Orientation | | | Characteristics of Media | | | | | |
|---|---|---|---|---|---|---|---|---|---|---|---|---|---|---|
| Sample No. | Hc (Oe) | Average Long Axis Length (μm) | Crystallite Size (Å) | Acicular Ratio | Nonmagnetic Layer Recipe | Preparation Method | Orientation Condition | Magnetic Field Strength of the Same Pole and Counter Position Magnet | Hc (Oe) | Or | SQn | Output (dB) | S/N (dB) | Electromagnetic Characteristics Modulation (%) |
| 1 | 2,350 | 0.1 | 150 | 7 | 1 | 1 | 1 | — | 2,200 | 0.99 | 0.34 | 0.0 | 0.0 | 1.5 |
| 2 | 2,350 | 0.1 | 150 | 7 | 1 | 1 | 2 | 1,000 Oe | 2,190 | 0.99 | 0.30 | 0.0 | 3.0 | 1.5 |
| 3 | 2,350 | 0.1 | 150 | 7 | 1 | 1 | 2 | 2,000 Oe | 2,180 | 0.97 | 0.28 | 0.0 | 3.5 | 2.5 |
| 4 | 2,350 | 0.1 | 150 | 7 | 1 | 1 | 2 | 4,000 Oe | 2,170 | 0.96 | 0.25 | 0.0 | 4.0 | 3.0 |
| 5 | 2,350 | 0.1 | 150 | 7 | 1 | 1 | 2 | 6,000 Oe | 2,160 | 0.95 | 0.22 | 0.0 | 4.5 | 3.6 |

TABLE 1-continued

| | Characteristics of Magnetic Powder | | | | | Orientation | | | Characteristics of Media | | | | | |
|---|---|---|---|---|---|---|---|---|---|---|---|---|---|---|
| | | Average Long | Crystal- | | Non- | | Orienta- | Magnetic Field Strength of the | | | | Electromagnetic Characteristics | | |
| Sample No. | Hc (Oe) | Axis Length (μm) | lite Size (Å) | Acicular Ratio | magnetic Layer Recipe | Prepara- tion Method | tion Con- dition | Same Pole and Counter Position Magnet | Hc (Oe) | Or | SQn | Output (dB) | S/N (dB) | Modula- tion (%) |
| 6 | 2,350 | 0.1 | 150 | 7 | 1 | 1 | 2 | 8,000 Oe | 2,150 | 0.83 | 0.18 | 0.0 | 1.0 | 10.3 |
| 7 | 2,350 | 0.1 | 150 | 7 | 1 | 1 | 3 | 1,000 Oe (1st stage) + 800 Oe (2nd stage) | 2,190 | 0.97 | 0.30 | 2.0 | 4.0 | 2.5 |
| 8 | 2,350 | 0.1 | 150 | 7 | 1 | 1 | 3 | 2,000 Oe (1st stage) + 1,600 Oe (2nd stage) | 2,180 | 0.97 | 0.28 | 2.0 | 4.5 | 2.5 |
| 9 | 2,350 | 0.1 | 150 | 7 | 1 | 1 | 3 | 4,000 Oe (1st stage) + 3,200 Oe (2nd stage) | 2,170 | 0.97 | 0.25 | 2.0 | 5.0 | 2.5 |
| 10 | 2,350 | 0.1 | 150 | 7 | 1 | 1 | 3 | 6,000 Oe (1st stage) + 4,800 Oe (2nd stage) | 2,160 | 0.97 | 0.22 | 2.0 | 5.5 | 2.5 |
| 11 | 2,350 | 0.1 | 150 | 7 | 1 | 1 | 3 | 4,000 Oe (1st stage) + 3,200 Oe (2nd stage) + 2,400 Oe (3rd stage) | 2,160 | 0.98 | 0.20 | 2.5 | 7.0 | 2.0 |
| 12 | 2,350 | 0.1 | 150 | 7 | 1 | 1 | 3 | 4,000 Oe (1st stage) + 3,200 Oe (2nd stage) + 2,400 Oe (3rd stage) + 1,600 Oe (4th stage) | 2,150 | 0.99 | 0.18 | 3.0 | 8.0 | 1.5 |
| 13 | 1,800 | 0.1 | 150 | 7 | 1 | 1 | 2 | 6,000 Oe | 1,650 | 0.45 | 0.22 | −2.0 | 0.0 | 3.6 |
| 14 | 1,900 | 0.1 | 150 | 7 | 1 | 1 | 2 | 6,000 Oe | 1,750 | 0.95 | 0.22 | −0.5 | 4.0 | 3.6 |
| 15 | 2,100 | 0.1 | 150 | 7 | 1 | 1 | 2 | 6,000 Oe | 1,950 | 0.95 | 0.22 | 0.0 | 4.5 | 3.6 |
| 16 | 2,500 | 0.1 | 150 | 7 | 1 | 1 | 2 | 6,000 Oe | 2,350 | 0.95 | 0.22 | 1.0 | 6.0 | 3.6 |
| 17 | 2,350 | 0.2 | 150 | 13 | 1 | 1 | 2 | 6,000 Oe | 2,200 | 0.80 | 0.18 | −1.0 | −4.0 | 12.1 |
| 18 | 2,350 | 0.18 | 150 | 12 | 1 | 1 | 2 | 6,000 Oe | 2,200 | 0.83 | 0.20 | −0.5 | −3.0 | 10.3 |
| 19 | 2,350 | 0.13 | 150 | 9 | 1 | 1 | 2 | 6,000 Oe | 2,200 | 0.95 | 0.21 | 0.0 | 3.0 | 3.6 |
| 20 | 2,350 | 0.05 | 150 | 3 | 1 | 1 | 2 | 6,000 Oe | 2,200 | 0.97 | 0.23 | 0.0 | 6.0 | 2.5 |

TABLE 2

| | Characteristics of Magnetic Powder | | | | | Orientation | | | Characteristics of Media | | | | | |
|---|---|---|---|---|---|---|---|---|---|---|---|---|---|---|
| | | Average Long | Crystal- | | Non- | | Orienta- | Magnetic Field Strength of | | | | Electromagnetic Characteristics | | |
| Sample No. | Hc (Oe) | Axis Length (μm) | lite Size (Å) | Acicular Ratio | magnetic Layer Recipe | Prepara- tion Method | tion Con- dition | the Same Pole and Counter Position Magnet | Hc (Oe) | Or | SQn | Output (dB) | S/N (dB) | Modula- ation (%) |
| 21 | 2,350 | 0.1 | 200 | 5 | 1 | 1 | 2 | 6,000 Oe | 2,200 | 0.96 | 0.23 | −1.0 | −4.0 | 3.0 |
| 22 | 2,350 | 0.1 | 180 | 5 | 1 | 1 | 2 | 6,000 Oe | 2,200 | 0.96 | 0.23 | 0.0 | 3.0 | 3.0 |
| 23 | 2,350 | 0.1 | 170 | 6 | 1 | 1 | 2 | 6,000 Oe | 2,200 | 0.95 | 0.22 | 0.0 | 4.0 | 3.6 |
| 24 | 2,350 | 0.1 | 130 | 8 | 1 | 1 | 2 | 6,000 Oe | 2,200 | 0.95 | 0.22 | 0.0 | 6.0 | 3.6 |
| 25 | 2,350 | 0.1 | 150 | 7 | 2 | 1 | 1 | — | 2,200 | 0.99 | 0.34 | 2.0 | 0.5 | 1.5 |
| 26 | 2,350 | 0.1 | 150 | 7 | 2 | 1 | 2 | 1,000 Oe | 2,190 | 0.99 | 0.30 | 2.0 | 5.0 | 1.5 |
| 27 | 2,350 | 0.1 | 150 | 7 | 2 | 1 | 2 | 2,000 Oe | 2,180 | 0.97 | 0.28 | 2.0 | 5.5 | 2.5 |
| 28 | 2,350 | 0.1 | 150 | 7 | 2 | 1 | 2 | 4,000 Oe | 2,170 | 0.96 | 0.25 | 2.0 | 6.0 | 3.0 |
| 29 | 2,350 | 0.1 | 150 | 7 | 2 | 1 | 2 | 6,000 Oe | 2,160 | 0.95 | 0.22 | 2.0 | 6.5 | 3.6 |
| 30 | 2,350 | 0.1 | 150 | 7 | 2 | 1 | 2 | 8,000 Oe | 2,150 | 0.83 | 0.18 | 2.0 | 1.0 | 10.3 |
| 31 | 2,350 | 0.1 | 150 | 7 | 1 | 2 | 2 | 1,000 Oe | 2,190 | 0.99 | 0.30 | 0.0 | 2.0 | 1.5 |
| 32 | 2,350 | 0.1 | 150 | 7 | 1 | 2 | 2 | 2,000 Oe | 2,180 | 0.97 | 0.28 | 0.0 | 2.5 | 2.5 |
| 33 | 2,350 | 0.1 | 150 | 7 | 1 | 2 | 2 | 4,000 Oe | 2,170 | 0.96 | 0.25 | 0.0 | 3.0 | 3.0 |
| 34 | 2,350 | 0.1 | 150 | 7 | 1 | 2 | 2 | 6,000 Oe | 2,160 | 0.95 | 0.22 | 0.0 | 3.5 | 3.6 |
| 35 | 2,350 | 0.1 | 150 | 7 | 1 | 2 | 2 | 8,000 Oe | 2,150 | 0.83 | 0.18 | 0.0 | 1.0 | 10.3 |
| 36 | 2,350 | 0.1 | 150 | 7 | — | 3 | 1 | — | 2,200 | 0.99 | 0.34 | −1.0 | −2.0 | 1.5 |
| 37 | 2,350 | 0.1 | 150 | 7 | — | 3 | 2 | 1,000 Oe | 2,190 | 0.99 | 0.30 | −1.0 | 2.0 | 1.5 |
| 38 | 2,350 | 0.1 | 150 | 7 | — | 3 | 2 | 2,000 Oe | 2,180 | 0.97 | 0.28 | −1.0 | 2.5 | 2.5 |
| 39 | 2,350 | 0.1 | 150 | 7 | — | 3 | 2 | 4,000 Oe | 2,170 | 0.96 | 0.25 | −1.0 | 3.0 | 3.0 |
| 40 | 2,350 | 0.1 | 150 | 7 | — | 3 | 2 | 6,000 Oe | 2,160 | 0.95 | 0.22 | −1.0 | 3.5 | 3.6 |
| 41 | 2,350 | 0.1 | 150 | 7 | — | 3 | 2 | 8,000 Oe | 2,150 | 0.83 | 0.18 | −1.0 | 0.0 | 10.3 |

The present invention can provide stably a high capacity disc-like magnetic recording medium excellent in electromagnetic characteristics by regulating each of the average long axis length and the crystallite size of ferromagnetic powders, the coercive force (Hc) of the magnetic layer, the in-plane orientation ratio (Or) of the magnetic layer, and the squareness ratio in the vertical direction to the surface of the magnetic layer (SQn) within a specified range, and preferably by an ATOMM system.

Sample No. 1 (SQn, output, S/N), No. 6 (Or, S/N, modulation), No. 13 (Hc, output, S/N), No. 17 (average long axis length, acicular ratio, Or, output, S/N, modulation), No. 18 (acicular ratio, Or, output, S/N, modulation), No. 21 (crystallite size, output, S/N), No. 25 (SQn, output, S/N), No. 30 (Or, S/N, modulation), No. 35 (Or, S/N, modulation), No. 36 (SQn, output, S/N), and No. 41 (Or, output, S/N, modulation) are comparative examples and descriptions in parentheses are factors outside of the present invention or characteristics not improved, and other sample Nos. are the present invention.

EFFECT OF THE INVENTION

The present invention can provide stably a high capacity disc-like magnetic recording medium excellent in electro-magnetic characteristics by regulating each of the average long axis length and the crystallite size of ferromagnetic powders, the coercive force (Hc) of the magnetic layer, the in-plane orientation ratio (Or) of the magnetic layer, and the squareness ratio in the vertical direction to the surface of the magnetic layer (SQn) within a specified range, and preferably by an ATOMM system.

While the invention has been described in detail and with reference to specific examples thereof, it will be apparent to one skilled in the art that various changes and modifications can be made therein without departing from the spirit and scope thereof.

What is claimed is:

1. A disc-like magnetic recording medium which comprises a support having thereon a magnetic layer comprising a ferromagnetic powder and a binder as main components, wherein the ferromagnetic powder has an average long axis length of from 0.01 to 0.18 μm, a crystallite size of from 50 to 180 Å, an acicular ratio of from 2 to 9, the magnetic layer has the coercive force Hc of from 1,700 to 3,000 Oe, an in-plane orientation ratio of 0.85 or more, and a squareness ratio in the vertical direction to the surface of the magnetic layer of 0.30 or less.

2. The disc-like magnetic recording medium as claimed in claim 1, wherein said magnetic layer is provided on a substantially nonmagnetic lower layer provided on the support.

3. The disc-like magnetic recording medium as claimed in claim 1, wherein said ferromagnetic powder is a ferromagnetic metal powder.

4. The disc-like magnetic recording medium as claimed in claim 1, wherein said magnetic layer has a thickness of from 0.02 to 0.5 μm.

5. The disc-like magnetic recording medium as claimed in claim 1, wherein said disc-like magnetic recording medium is a magnetic recording medium for a magnetic recording/reproduction system requiring an areal recording density of from 0.15 to 2.0 G bit/inch$^2$.

6. The disc-like magnetic recording medium as claimed in claim 3, wherein said ferromagnetic metal powder has an average long axis length of from 0.06 to 0.12 μm and a crystallite size of from 80 to 160 Å.

7. The disc-like magnetic recording medium as claimed in claim 1, wherein said ferromagnetic powder has an acicular ratio of from 4 to 7.

8. The disc-like magnetic recording medium as claimed in claim 1, wherein said magnetic layer has a coercive force of from 1,800 to 2,700 Oe.

9. The disc-like magnetic recording medium as claimed in claim 1, wherein said magnetic layer has a coercive force of from 2,000 to 2,500 Oe.

10. The disc-like magnetic recording medium as claimed in claim 1, wherein said magnetic layer has an in-plane orientation ratio of 0.90 or more.

11. The disc-like magnetic recording medium as claimed in claim 1, wherein the squareness ratio in the vertical direction to the surface of the magnetic layer is 0.28 or less.

12. The disc-like magnetic recording medium as claimed in claim 1, wherein said binder is a polar group-containing resin.

13. The disc-like magnetic recording medium as claimed in claim 2, wherein said magnetic recording medium is a disc-like magnetic recording medium in which said upper magnetic layer and substantially nonmagnetic lower layer are coated on the support by the wet on wet coating method.

* * * * *